Sept. 26, 1950     M. H. ARMS     2,523,983
HIGH-SPEED ROTOR MOUNTING
Filed May 5, 1949

INVENTOR
MERTON H. ARMS
ATTYS

Patented Sept. 26, 1950

2,523,983

UNITED STATES PATENT OFFICE 2,523,983

HIGH-SPEED ROTOR MOUNTING

Merton H. Arms, Springfield, Vt., assignor to Bryant Chucking Grinder Company, Springfield, Vt., a corporation of Vermont Application May 5, 1949, Serial No. 91,429

9 Claims. (Cl. 308—184)

This invention relates to the mounting of rotors designed to operate at high rotational speeds such as of the order of 75,000 R. P. M. and higher. Such rotors, for example, may be those of high frequency electric motors and may carry small diameter grinding wheels. Grinding wheels require high peripheral velocities for best results, and due to the small diameters of the grinding wheels necessary for grinding small holes, high rotation speeds are necessary to produce the desired high peripheral velocity.

Such high speed rotors require simple bearings and such bearings must be so mounted as to accommodate themselves automatically to changing operating conditions and without undue tightness or looseness.

One object of the present invention, therefore, is to provide anti-friction bearing mountings which are preloaded to the desired degree so as to avoid undesirable play but which are arranged to be self-adjusting under changes due, for example, to temperature variations.

Further objects and advantages will appear from a complete description of an embodiment of the invention shown in the accompanying drawings.

Figure 1:
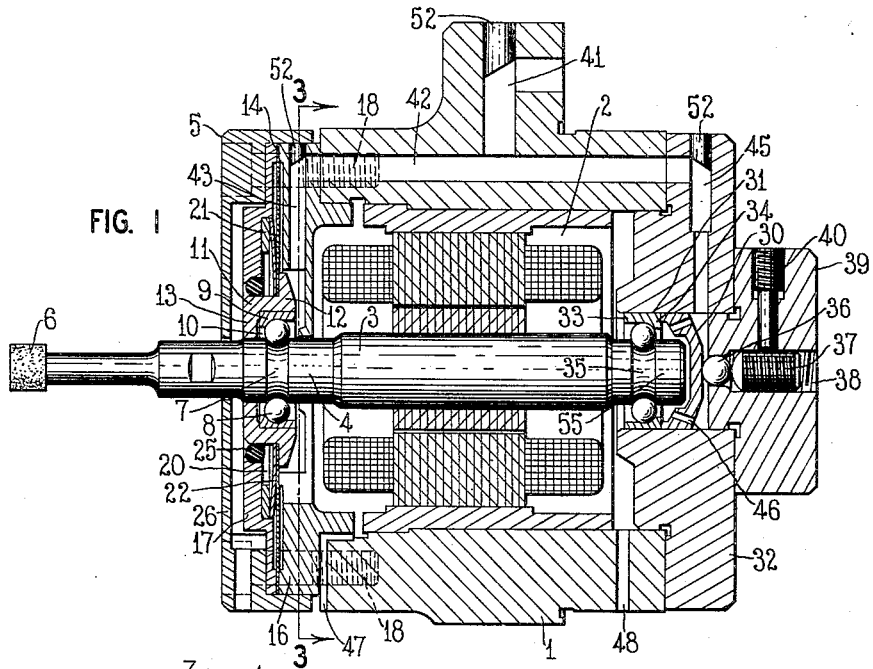
Figure 1 is a central sectional view through a high frequency motor embodying the invention.

Referring to the drawings, at 1 is indicated the casing of a high frequency motor carrying on its inside face suitable stator windings indicated generally at 2. Within these stator windings is mounted a rotor 3 having extensions 4 and 55. One of these extensions as 4 projects outwardly of an end cap plate 5 of the motor casing and may carry a grinding wheel 6 or other suitable device. The extension 4 may have integral therewith the inner raceway 7 of a ball bearing 8, the outer raceway of which 9 is an angular contact raceway having its smaller diameter end portion 10 positioned at the outer face of the bearing. This raceway 9, as shown, is carried by a sleeve 11 provided at its inner side with a transversely extending outwardly projecting flange 12 and on its outer end with an inwardly projecting flange 13 which presents an annular shoulder with which the outer face of the outer raceway 9 engages. The flange 12 bears on its outer face against the inner face of a flexible diaphragm 14, and, if desired, the flange 12 may be secured thereto as by soldering or brazing, the diaphragm having a central opening 15 through which the sleeve 11 projects.

The outer periphery of the diaphragm 14 is fixed rigidly in position, being extended between a pair of ring members 16 and 17, both of which are clamped in position as by screws 18 which also pass through the end cap 5 through the ring members 17 and 16 and into the casing member 1.

The ring member 17 is provided with a centrally outwardly offset portion forming a socket 20 for the reception of a hardened bearing ring 21 which engages the outer portion of a dished flat ring or Belleville spring 22, the inner face of which adjacent to its central opening 220 engages against the outer face of the diaphragm 14. The ring 17 is provided with a central opening 23 preferably having an inclined outer seat portion 24 upon which may bear the outer periphery of a ring 25 of deformable material which is seated between the ring 17 and the outer face of the sleeve 11. This ring of deformable material acts as a shock absorber or damper tending to absorb vibration of the rotor and also acts as a seal to prevent the entrance of foreign material which may find its way past the outer wall portion 26 of the end cap from obtaining access into the chamber 20. The material of which the ring 17 is formed is preferably mounted under compression with an initial load such that the natural frequency of the damping means is considerably slower than the forced frequency of vibration of the system, so as to give an insulating ratio of at least 2.5 to 1.

Figure 2:
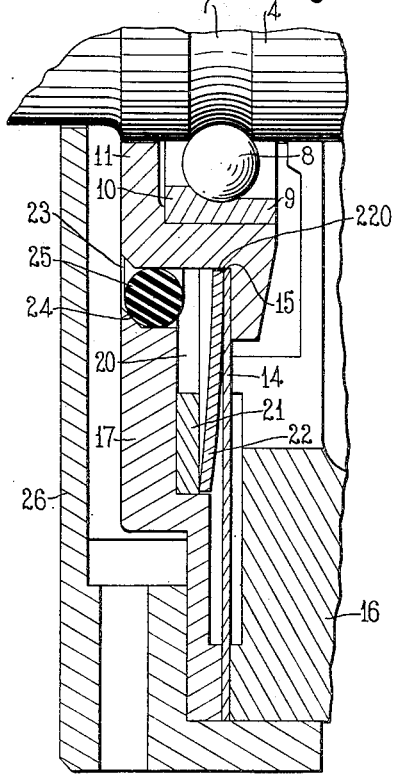
Figure 2 is a fragmentary view similar to a portion of Figure 1 but drawn to a larger scale.

Loading pressure is applied to the ball bearings by exerting axial pressure on the rotor toward the left as viewed in Figures 1 and 2, this pressure being opposed by the diaphragm 14 and the Belleville spring 22. As shown this loading is accomplished by pressure exerted against the transverse wall of a sleeve 30 slidably mounted in a bore 31 in a cap member 32 which closes off the rear or right hand end of the motor casing. This sleeve 30 bears at its outer margin against the outer raceway 33 of an angle contact ball bearing spaced from the ball bearing 8 and in opposed relation thereto, the small diameter portion 34 of the outer raceway 33 being arranged outwardly. The inner raceway 35 is formed by a groove cut directly into the rotor extension 55. Bearing against the central portion of the sleeve 30 substantially coaxial with the rotor is a ball 36 backed up by a plug 37 threaded into a central opening 38 in a central cap member 39 suitably secured in the outer end of the bore 31 of the cap member 32. By screwing inwardly on the member 37, the rotor may be moved to the left, applying loading pressure by the reaction of the Belleville spring 22 and the diaphragm 14, and when in the desired adjusted position, it may be fixed therein as by tightening a set screw 40 seated in a threaded opening in the cap member 39. The ball 36 allows the adjacent outer ball bearing ring 33 to automatically adjust angularly, compensating for slight inaccuracies in the bearing, as more fully recited in the patent application of Willis F. Moore, Serial No. 23,911, filed April 29, 1948, for Spindle Mounting for High Speeds now Patent No. 2,502,874, granted April 4, 1950.

The interaction between the diaphragm 14 and the Belleville spring 22 can be arranged to approximate an ideal load condition. The diaphragm may have an initial loading position supported by the spring. A temperature differential in the mechanism as it heats up during operation can be expected to expand the rotor lengthwise which further deflects the diaphragm and the spring. It is the nature of a diaphragm that such added deflection will raise the load on the system, and in some cases this might introduce undue stresses. However, by making the diaphragm very weak and letting it mainly function as a radial restraining member for the system while the Belleville spring takes care of the axial loading, undue stresses from flexure of the diaphragm may be avoided, the percentage of extra axial load due to its flexure being very small. By employing a spring of the so-called "constant load deflection type," as a Belleville spring, as described on pages 251 to 254 of the work "Mechanical Springs" by A. M. Wall published in Cleveland, 1944, added deflection of the spring will impose practically no extra loading stress on the system.

Lubricant, preferably in the form of a mist of lubricating oil and air, may be delivered to the bearings as through a passage 41 which leads into a branch passage 42, one end of which communicates through a radial passage 43 in the ring 16 which leads toward the inner face of the sleeve 11 and is directed by the inner portion of the ring 16 toward the left hand ball bearing. The other end of the passage 42 may lead through a similar passage 45 to the outer face of the sleeve 30 which is provided with holes 46 through which it may find access to the outer face of the right hand ball bearing. Suitable drain passages 47 and 48 may conduct excess lubricant out from the rotor casing.

Figure 3:
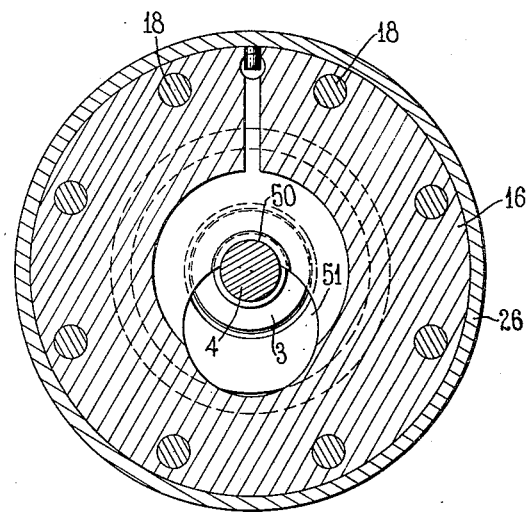
Figure 3 is a sectional view on line 3—3 of Figure 1.

As shown best in Figure 3, the ring 16 is provided with a central aperture 50 engaging over the upper half of the extension 4 with which communicates a larger cylindrical opening 51 about the lower portion of the shaft extension 4, this opening 51 being of sufficiently large diameter to permit the insertion therethrough of the largest diameter portion of the rotor 3. This facilitates assembling of the rotor within the stator. The various passages for lubricant may be closed off at their outer ends where desired as by suitable plugs 52.

Generic claims to the subject matter of the present application and an application Serial No. 89,758, filed April 26, 1949, by Bryant and Ljunggren are contained in said Bryant and Ljunggren application.

I claim:

1. In combination, a rotor, a pair of spaced opposed angular contact ball bearings supporting said rotor, a diaphragm supporting one of said ball bearings, means fixing the outer margin of said diaphragm, means engaging with the other of said bearings for loading said bearings, and yieldable means engaging said diaphragm and opposing said loading means.

2. In combination, a rotor, a pair of spaced opposed angular contact ball bearings supporting said rotor, a diaphragm supporting one of said ball bearings, means fixing the outer margin of said diaphragm, means engaging with the other of said bearings for loading said bearings, and yieldable means engaging said diaphragm and opposing said loading means, said diaphragm having substantial radial stiffness and readily yieldable axially, and said yieldable means having a substantially constant load deflection characteristic axially and non-restrictive radially.

3. In combination, a rotor, a pair of spaced opposed angular contact ball bearings supporting said rotor, a diaphragm supporting one of said ball bearings, means fixing the outer margin of said diaphragm, means engaging with the other of said bearings and pressing said rotor axially toward the other of said bearings, and a Belleville spring reacting against the outer face of said diaphragm opposing the thrust exerted by said means on said rotor.

4. In combination, a rotor, a pair of spaced angular contact ball bearings supporting said rotor, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, and a Belleville spring engaging the face of said diaphragm opposite to said flange and opposing the thrust of said adjusting means, said diaphragm having substantially radial stiffness but readily yieldable axially, and said Belleville spring being relatively non-restrictive radially but with a substantially constant load deflection characteristic axially.

5. In combination, a rotor, a pair of spaced angular contact ball bearings supporting said rotor, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, and a spring engaging the face of said diaphragm opposite to said flange and opposing the thrust of said adjusting means.

6. In combination, a rotor, a pair of spaced angular contact ball bearings supporting said rotor, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, a spring engaging the face of said diaphragm opposite to said flange and opposing the thrust of said adjusting means, a stationary member having an opening into which said collar projects, and a ring of deformable material interposed between said collar and stationary member.

7. In combination, a rotor, a pair of spaced angular contact ball bearings supporting said rotor, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, a spring engaging the face of said diaphragm opposite to said flange and opposing the thrust of said adjusting means, a stationary member having an opening into which said collar projects and damping means comprising a vibration absorbing member interposed between said collar and stationary member.

8. In combination, a rotor, a pair of spaced angular contact ball bearings supporting said rotor, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, a spring engaging the face of said diaphragm opposite to said flange and opposing the thrust of said adjusting means, a stationary member having an opening into which said collar projects, and damping means mounted under compression between said collar and stationary member.

9. In combination, a stator, a rotor, a pair of spaced angular contact ball bearings supporting said rotor within said stator, a collar having a flange perpendicular to its axis and supporting one of said bearings, a diaphragm having a central opening to receive said collar and with said flange bearing on one face of said diaphragm, means for adjusting the other of said bearings axially in direction to press said flange against said diaphragm, means fixing the outer periphery of said diaphragm, a spring engaging the face of said diaphragm opposite to said flange and opposing the thrust of said adjusting means, and a stationary plate inwardly of said diaphragm having a lubricant passage leading toward said one bearing and having a passage therethrough through which said rotor may be assembled within said stator.

MERTON H. ARMS.

No references cited.